(12) United States Patent
Czaplicki et al.

(10) Patent No.: US 11,434,392 B2
(45) Date of Patent: Sep. 6, 2022

(54) MALONATE AND CYANOACRYLATE ADHESIVES FOR JOINING DISSIMILAR MATERIALS

(71) Applicant: Zephyros, Inc., Romeo, MI (US)

(72) Inventors: Michael Czaplicki, Romeo, MI (US); Ken Mazich, Romeo, MI (US); Yuan Lu, Romeo, MI (US); Kevin Hicks, Romeo, MI (US); Austin O'Connor, Romeo, MI (US); Jason Walker, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 375 days.

(21) Appl. No.: 16/332,818

(22) PCT Filed: Sep. 19, 2017

(86) PCT No.: PCT/US2017/052254
§ 371 (c)(1),
(2) Date: Mar. 13, 2019

(87) PCT Pub. No.: WO2018/053503
PCT Pub. Date: Mar. 22, 2018

(65) Prior Publication Data
US 2019/0203075 A1 Jul. 4, 2019

Related U.S. Application Data

(60) Provisional application No. 62/396,559, filed on Sep. 19, 2016.

(51) Int. Cl.
| | | |
|---|---|---|
| *C09J 5/00* | (2006.01) | |
| *C08J 5/00* | (2006.01) | |
| *B32B 27/00* | (2006.01) | |
| *C09J 5/04* | (2006.01) | |
| *C09J 5/06* | (2006.01) | |
| *B32B 27/12* | (2006.01) | |
| *C08J 5/12* | (2006.01) | |
| *C09J 135/02* | (2006.01) | |
| *C09J 135/04* | (2006.01) | |

(52) U.S. Cl.
CPC .................. *C09J 5/04* (2013.01); *B32B 27/12* (2013.01); *C08J 5/124* (2013.01); *C08J 5/128* (2013.01); *C09J 5/06* (2013.01); *C09J 135/02* (2013.01); *C09J 135/04* (2013.01); *C08J 2327/14* (2013.01); *C08J 2361/06* (2013.01); *C08J 2433/04* (2013.01); *C08J 2435/02* (2013.01); *C08J 2435/04* (2013.01); *C09J 2427/006* (2013.01); *C09J 2427/008* (2013.01); *C09J 2433/00* (2013.01); *C09J 2461/006* (2013.01); *C09J 2461/008* (2013.01)

(58) Field of Classification Search
CPC ......... C09J 5/00; C09J 5/04; C09J 5/06; C09J 135/00; C09J 135/02; C09J 135/04; C08J 5/00; C08J 5/10; C08J 5/12; C08J 5/124; C08J 5/128; B32B 27/00; B32B 27/10; B32B 27/12
See application file for complete search history.

(56) References Cited

U.S. PATENT DOCUMENTS

| | | | |
|---|---|---|---|
| 4,160,864 A | 7/1979 | Ponticello | |
| 8,609,885 B2 * | 12/2013 | Malofsky | .............. C08F 136/20 560/190 |
| 8,884,051 B2 | 11/2014 | Malofsky et al. | |
| 9,181,365 B2 * | 11/2015 | Malofsky | .................. C08F 2/38 |
| 9,217,098 B1 | 12/2015 | Stevenson | |
| 2014/0329980 A1 * | 11/2014 | Malofsky | .............. C08F 128/06 526/309 |
| 2015/0056879 A1 | 2/2015 | Malofsky | |

FOREIGN PATENT DOCUMENTS

| | | |
|---|---|---|
| EP | 2993211 A1 | 3/2016 |
| WO | 2013/149165 A1 | 10/2013 |
| WO | 2013/149168 A1 | 10/2013 |
| WO | 2014/078689 A1 | 5/2014 |

OTHER PUBLICATIONS

PCT Search Report & Written Opinion dated Nov. 6, 2017, Application No. PCT/US2017/052254.
PCT Search Report & Written Opinion dated Sep. 27, 2018, Application No. PCT/US2017/028853.

* cited by examiner

*Primary Examiner* — Jacob T Minskey
*Assistant Examiner* — Matthew Hoover
(74) *Attorney, Agent, or Firm* — The Dobrusin Law Firm, PC

(57) ABSTRACT

The present teachings contemplate a method comprising providing a first and second substrate, locating an initiator onto a surface of the first or second substrate, the initiator including a substance for initiating polymerization of a polymerizable adhesive, locating the polymerizable adhesive onto a surface of the first and second substrate, the adhesive including a monofunctional, difunctional, or multifunctional methylene malonate, or cyanoacrylate, and contacting first and second substrate.

20 Claims, No Drawings

MALONATE AND CYANOACRYLATE ADHESIVES FOR JOINING DISSIMILAR MATERIALS

TECHNICAL FIELD

The present invention relates generally to polymerizable adhesives that are polymerized upon contact with an initiator or a particular surface. The adhesives may be utilized to bond two surfaces together and the surfaces are easily separated upon exposure of the adhesive to a stimulus.

BACKGROUND

Polymeric adhesives are frequently utilized in laminate structures. However, such adhesives are typically difficult to remove and require time and/or chemicals to remove residue. As such, where a laminate structure may benefit from frequent modification (e.g., where the laminate is decorative in nature or serves as an advertising surface) the use of such adhesives is not preferred.

U.S. Pat. Nos. 8,609,885; 8,884,051; and 9,181,365 and U.S. Publication Nos. 2014/0329980 and 2015/0056879 may be relevant to the present teachings, and are all incorporated by reference for all purposes.

Notwithstanding the above teachings, there remains a need for an adhesive for effective adhering to surfaces and further allowing simplified removal with little or no residue.

SUMMARY OF THE INVENTION

One or more of the above needs are met by the present teachings which contemplate a method for bonding a laminate structure comprising providing a first and second substrate, locating an initiator onto a first surface of the first substrate, the initiator including a substance for initiating polymerization of a polymerizable adhesive. The method may further include locating the polymerizable adhesive onto a first surface the second substrate, the adhesive including a monofunctional, difunctional, multifunctional methylene malonate, or a cyanoacrylate and contacting the first surface of the first substrate with the first surface of the second substrate so that the initiator causes polymerization of the adhesive.

The first substrate may be a film layer. The film layer may be a polyvinyl fluoride film. The adhesive may be heat activated upon contact with the second substrate. The method may include polymerizing the adhesive in less than 5 minutes, less than 3 minutes or even less than 1 minute after contacting the adhesive with the initiator. The second substrate may be selected from a veneer, particle board, honeycomb panel, white board, polymeric material, film, or combinations thereof.

The initiator may be sodium benzoate. The second substrate may include a phenoxy component. The laminate structure may be re-heated to remove the first substrate from the second substrate such that the adhesive remains in contact with only the second substrate and minimal adhesive residue remains on the first substrate. The method may include removing the second substrate from the first substrate with substantially no adhesive residue remaining on the first substrate.

The method may include removing the second substrate from the first substrate by applying a stimulus to the adhesive. The method may include removing the second substrate from the first substrate by applying heat, UV light, or a chemical substance to the adhesive. One or more of the first or second surface may be a panel of a transportation vehicle such as a bus, a train, a boat, or a plane. One or more of the first or second surface may receive advertising or decorative material. The adhesive may be a thermoplastic material. Upon separation of the first substrate from the second substrate, the adhesive remains in contact with only the second substrate and the first substrate is substantially free of any remaining adhesive. The method may include a step of adding texture to one or more of the first and second substrate prior to contacting the first substrate to the second substrate.

The teachings provided herein are further directed to a method for bonding a laminate structure comprising providing a first and second substrate and locating the polymerizable adhesive onto a first surface the second substrate, the adhesive including a monofunctional, difunctional or multifunctional methylene malonate or a cyanoacrylate. The method may further include contacting the first surface of the first substrate with a first surface of the second substrate, wherein the material composition of the first substrate is reactive with and causes polymerization of the adhesive. The method of claim may include a step of adding an initiator to the first substrate.

DETAILED DESCRIPTION

The explanations and illustrations presented herein are intended to acquaint others skilled in the art with the invention, its principles, and its practical application. The specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Ser. No. 62/396,559, filed Sep. 19, 2016, the contents of that application being hereby incorporated by reference for all purposes.

The adhesive materials described herein may include a dicarbonyl compound represented by the formula

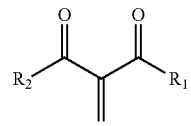

and having a viscosity of from about 50 cps to about 500 cps, wherein the adhesive initiates by either: (i) spontaneous polymerization (e.g., in less than about one minute) at room temperature of the composition with or without the addition of an initiator; or (ii) polymerization at room temperature at a selected later time with or without the addition of an initiator. An initiator may be utilized.

The initiator may be based on an acid. The initiator may be a salt or ester of an acid. The initiator may be based upon a carboxylic acid. The initiator may include one or more of carbonic acid, formic acid, methanoic acid, benzoic acid, acetic acid, propionic acid, caproic acid, or the salt or ester of these acids. The initiator may be utilized to accelerate the reaction time, but is not essential. Then initiator may be useful to control the polymerization rate. The polymerization can be accelerated by heat application in some cases, but it is not essential.

The adhesive may be applied to a substrate that is free of any initiator. The substrate to which the adhesive is applied may also be a nonreactive substrate (e.g., comprises materials that will not cause the adhesive to prematurely polymerize). The initiator (if present) may be applied to a substrate which will eventually be bonded to the substrate containing the adhesive. Alternatively, that substrate may be formed of a reactive material (e.g., comprises materials that will cause the adhesive to polymerize. As a result, the adhesive can be applies to a substrate with no concern for premature polymerization.

The substrates that receive the adhesive or are bonded to the substrate with the adhesive (e.g., the first and second substrates) may comprise dissimilar materials. They may be metallic. They may be polymeric. They may be composites. They may contain one or more reinforcement materials (e.g., reinforcing fibers). The substrates may be laminate materials. They may be decorative materials. One or more substrates may be substantially flexible (e.g., capable of being rolled or folded). The substrates may be a veneer, particle board, honeycomb panel, white board, film, or combinations thereof. The substrates may include one or more thermoplastic modifiers such as polyethers which include pendant hydroxyl moieties. Particularly desirable thermoplastic polyethers are phenoxy resins. As used herein, phenoxy resin is a polyhydroxyether, with ether linkages along the polymer backbone and pendant hydroxyl groups. One useful phenoxy resin is the reaction product of a phenol based difunctional epoxy resin and a difunctional phenol (for example the reaction product of bisphenol A epoxy with bisphenol A). A similar material may also be synthesized directly from a bisphenol (for example bisphenol A) and epichlorohydrin. The terminal epoxy group may be ring opened to generate a terminal alpha glycol group. The phenoxy resins have weight-average molecular weights of at least about 5,000, more typically at least about 25,000 and still more typically at least about 50,000 but less than about 100,000, more typically less than about 75,000 and still more typically less than about 60,000. Other thermoplastic polyethers include aromatic ether/amine repeating units in their backbones such as polyetheramines, poly(amino ethers), copolymers of monoethanolamine and diglycidyl ether, combinations thereof or the like.

In utilizing malonates and cyanoacrylates, it is possible that many chemical components typically utilized to formulate adhesives make the adhesive unstable. Thus, the adhesive may comprise only a malonate, a cyanoacrylate, or some combination thereof. However, it is also possible that a number of materials may improve the physical characteristics of the adhesive without compromising the polymerization capability of the adhesive. As such, the adhesive may be formulated to include one or more additional monomers, one or more polymers, or one or more fillers (e.g., pigments). It is also possible that the adhesive does not require an initiator to polymerize. As one example, the adhesive may polymerize upon contact with certain substrates (e.g., the first substrate). Alternatively, the adhesive may polymerize over time depending on temperature or available light. The initiator may merely act to increase the speed at which the adhesive polymerizes.

The adhesive may include one or more additional monomers. The monomers may be selected from acrylate, acrylic acid, ethyl acrylate, methacrylate, ethyl cyanoacrylate, ethylene, ethylene oxide, acrylonitrile, 1,3-butadiene, butyl acrylate, butyl cyanoacrylate, cyclobutene, dicyclopentadiene, 3,4-dimethoxystyrene, glycidyl methacrylate, styrene, (hydroxyethyl)methacrylate, N-(2-Hydroxypropyl) methacrylamide, methacrylamide, methacrylic acid, methacrylonitrile, methyl 2-chloroacrylate, methyl 2-fluoroacrylate, methyl acrylate, methyl cyanoacrylate, methyl isocyanate, methyl methacrylate, 1,8-octanediol, octene, octyl cyanoacrylate, 2-octyl cyanoacrylate, trimethylene carbonate, phenylenediamine, tetrafluoroethylene, vinyl acetate, vinyl chloride, vinyl ether, or any combination thereof.

The adhesive material of the present teachings may also include one or more fillers, including but not limited to particulate materials (e.g., powder), beads, microspheres, or the like. Examples of fillers that may be used include silica, glass, talc, pigments, colorants, glass beads or bubbles. Examples of suitable fillers also include, without limitation, wollastonite, talc, vermiculite, pyrophyllite, sauconite, saponite, nontronite, montmorillonite or mixtures thereof. One or more mineral or stone type fillers such as calcium carbonate, sodium carbonate or the like may be used as fillers. Silicate minerals such as mica may be used as fillers.

When employed, the amount of fillers in the adhesive can range from 2% to more than 30% or greater by weight, but more typical from about 8 to 25% by weight. According to some embodiments, the adhesive may include from about 0% to about 3% by weight, and more preferably slightly less than 1% by weight silica or similar fillers. Powdered (e.g. about 0.01 to about 50, and more preferably about 1 to 25 micron mean particle diameter) mineral type filler can comprise between about 5% and 40% by weight, more preferably about 10% to about 25% by weight.

Several additional polymers may be incorporated into the adhesive, e.g., by copolymerization, by blending, or otherwise. For example, without limitation, other polymers that might be appropriately incorporated into the adhesive material include halogenated polymers, polycarbonates, polyketones, urethanes, polyesters, silanes, sulfones, allyls, olefins, styrenes, acetates, ethylene vinyl acetates, acrylates, methacrylates, epoxies, silicones, phenolics, rubbers, polyphenylene oxides, terphthalates, or mixtures thereof. Other potential polymeric materials may be or may include, without limitation, polyethylene, polypropylene, polystyrene, polyolefin, polyacrylate, poly(ethylene oxide), poly(ethyleneimine), polyester, polyurethane, polysiloxane, polyether, polyphosphazine, polyimide, polyimide, polyisobutylene, polyacrylonitrile, poly(vinyl chloride), poly(methylmethacrylate), poly(vinyl acetate), poly(vinylidene chloride), polytetrafluoroethylene, polyisoprene, polyacrylamide, polyacrylic acid, polymethacrylate, and polyacetals. The amount of each monomer or of the monomers as a whole, including the malonate and cyanoacrylate components (if present) can range from 0.05% to more than 80% or greater by weight, but more typical from about 1% to 60% by weight, or even from 5% to 40%.

It is possible that the adhesive may include one or more additional polymers (e.g., copolymers), which are typically, but not necessarily copolymers or terpolymers, which can include a variety of different polymers, such as thermoplastics, elastomers, thermosets, thermosettables combinations thereof or the like. For example, and without limitation, polymers that might be appropriately incorporated into the adhesive include halogenated polymers, polycarbonates, polyketones, and polymers of urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, polyethylene oxide), poly(ethyleneimine), polyester, polyurethane, polysiloxane, polyether, polyphosphazine, polyamide, polyimide, polyisobutylene, polyacrylonitrile, polyvinyl chloride), poly(methyl methacrylate), polyvinyl acetate), poly(vinylidene chloride), polytetrafluoroethylene, polyisoprene, polyacrylamide, polyacrylic acid, polymethacrylate. Although not required, it may be desired for the adhesive to include one or more ethylene polymers or copolymers such as ethylene acrylates, ethylene acetates, or the like. Ethylene methacrylate and ethylene vinyl acetate are two preferred ethylene copolymers. When used, the one or more additional polymers comprises about 0.1% to about 50%, more preferably about 1% to about 20% and even more preferably about 5% to about 15% by weight of the adhesive.

The adhesive may provide one or more of the following benefits. The adhesive may form a tack-free surface on an otherwise tacky material. The adhesive may adhere a secondary material (e.g., a film) to a substrate. The adhesive may allow for de-bonding of the the second substrate from the first substrate, with minimal residue on the first substrate. The adhesive may provide sufficient adhesion to the first substrate where the first substrate comprises a material that is generally difficult to adhere to.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A method for bonding a laminate structure comprising:
providing a first and second substrate;
locating an initiator onto a first surface of the first substrate, the initiator including a substance for initiating polymerization of a polymerizable adhesive;
locating the polymerizable adhesive onto a first surface of the second substrate, the adhesive including a monofunctional, difunctional, or multifunctional methylene malonate, or a cyanoacrylate;
contacting the first surface of the first substrate with the first surface of the second substrate so that the initiator causes polymerization of the adhesive.

2. The method of claim 1, wherein the first substrate is a film layer.

3. The method of claim 2, wherein the film layer is a polyvinyl fluoride film.

4. The method of claim 1, wherein the adhesive is heat activated upon contact with the second substrate.

5. The method of claim 1, including polymerizing the adhesive in less than 5 minutes, less than 3 minutes or even less than 1 minute after contacting the adhesive with the initiator.

6. The method of claim 1, wherein the second substrate is selected from a veneer, particle board, honeycomb panel, white board, polymeric material, film, or combinations thereof.

7. The method of claim 1, wherein the initiator is sodium benzoate.

8. The method of claim 1, wherein the second substrate includes a phenoxy component.

9. The method of claim 1, wherein the laminate structure can be heated after polymerization of the adhesive to remove the first substrate from the second substrate such that the adhesive remains in contact with only the first substrate and minimal adhesive residue remains on the second substrate.

10. The method of claim 1, including removing the second substrate from the first substrate with substantially no adhesive residue remaining on the first substrate.

11. The method of claim 1, including removing the second substrate from the first substrate by applying a stimulus to the adhesive.

12. The method of claim 1, including removing the second substrate from the first substrate by applying heat, UV light, or a chemical substance to the adhesive.

13. The method of claim 6, wherein one or more of the first or second surface is a panel of a transportation vehicle such as a bus, a train, a boat, or a plane.

14. The method of claim 1, wherein one or more of the first or second surface receives advertising or decorative material.

15. The method of claim 1, wherein the adhesive is a thermoplastic material.

16. The method of claim 15, wherein upon separation of the first substrate from the second substrate, the adhesive remains in contact with only the second substrate and the first substrate is substantially free of any remaining adhesive.

17. The method of claim 1, including a step of adding texture to one or more of the first and second substrate prior to contacting the first substrate to the second substrate.

18. A method for bonding a laminate structure comprising:
providing a first and second substrate;
locating a polymerizable adhesive onto a first surface of the second substrate, the adhesive including a monofunctional, difunctional or multifunctional methylene malonate or a cyanoacrylate;
contacting the first surface of the first substrate with a first surface of the second substrate, wherein the material composition of the first substrate is reactive with and causes polymerization of the adhesive.

19. The method of claim 18, wherein the polymerization of the adhesive allows for open time of at least about 5 minutes, at least about 15 minutes, at least about 30 minutes, or even at least about 60 minutes.

20. The method of claim 18, wherein the second substrate is a film layer.

* * * * *